May 9, 1939.　　D. D. ROBERTSON ET AL　　2,157,867
VALVE STEM PACKING
Filed Dec. 24, 1935
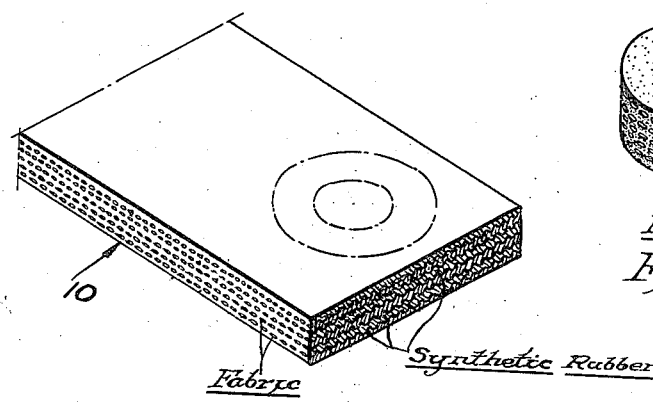
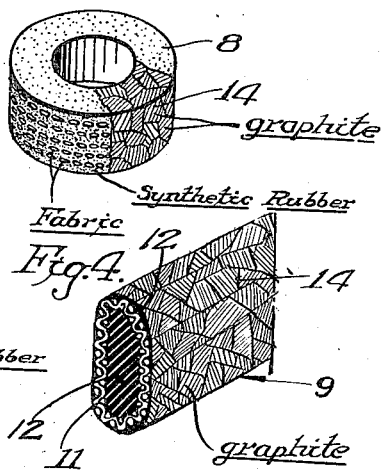
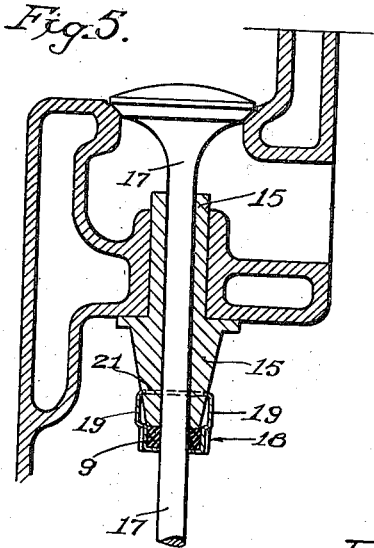
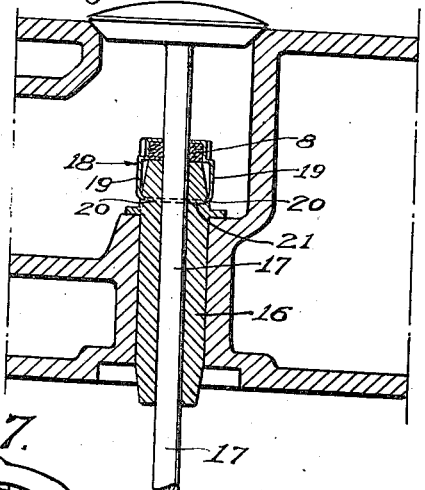
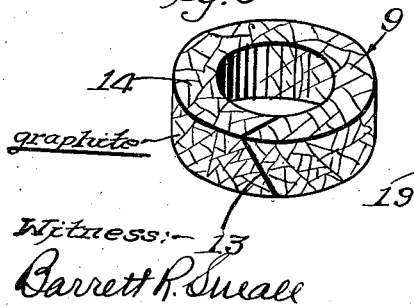
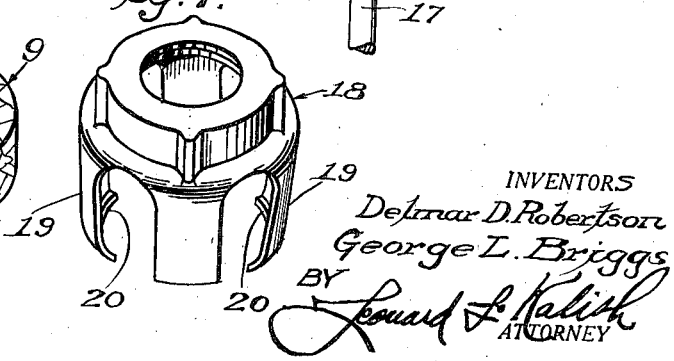
INVENTORS
Delmar D. Robertson
George L. Briggs
BY Leonard F. Kalish
ATTORNEY
Witness: Barrett R. Sweall Patented May 9, 1939

2,157,867

UNITED STATES PATENT OFFICE 2,157,867

VALVE STEM PACKING

Delmar D. Robertson, Lansdowne, and George L. Briggs, Bryn Mawr, Pa., assignors to Wilkening Manufacturing Company, Philadelphia, Pa., a corporation of Delaware Application December 24, 1935, Serial No. 55,981

2 Claims. (Cl. 123—188)

The present invention relates to valve-stem packing or sealing means, and relates more particularly to a generally annular sealing member for sealing valve stems in relation to the valve stem guides for use in conjunction with retaining cages which are adapted generally to confine such generally annular sealing members and are adapted to exert more or less axial pressure thereon in the direction of the valve stem guide thereby more or less to compress such sealing member between the cage and the end of the valve stem guide. An object of the present invention is to provide valve-stem sealing members of the general character stated, which may be more effective in use and which will be subject to less wear and which will not deteriorate as a result of the action of heat, oil and gasolene, and the vapors thereof, commonly incident to the normal operation of internal combustion engines and the like, and which will therefore have a comparatively longer useful life.

With the above and other objects in view which may appear more fully from the following detained description and accompanying drawings the present invention comprises or includes a more or less deformable or compressible, and more or less resilient or spring-like generally annular packing element or sealing member formed in part (or wholly) of an amorphous organic material, which is subject to deformation under pressure and which has substantial recovery when the pressure is removed and which is thus comparatively resilient and which will resist the action of and will not deteriorate under the influence of oils, gasolene or vapors thereof, under temperature conditions normally encountered in the intake passageways of the cylinder blocks or cylinder heads of internal combustion engines or the like.

The present invention further consists of other novel features and details of construction which may appear more fully from the following detailed description and accompanying drawing.

For the purpose of illustrating the invention, there is shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the accompanying drawing in which like reference characters indicate like parts:

Figure 1 represents a perspective view of a generally annular sealing member illustrating one embodiment of the present invention;

Figure 2 represents a fragmentary perspective view of a piece of stock from which the annular sealing member shown in Figure 1 may be cut;

Figure 3 represents a perspective view of a sealing member illustrating a somewhat modified embodiment of the present invention;

Figure 4 represents a small fragmentary portion of the strip material or strand material of which the annular member of Figure 3 may be formed.

Figure 5 represents a vertical sectional view of a fragmentary portion of the cylinder block showing the valve-stem guide and the valve stem therein with a sealing member or sealing element, of either of the embodiments, of the present invention, disposed in operative relation thereto.

Figure 6 represents another vertical sectional view of a fragmentary portion of the cylinder block or valve-stem guide and the valve-stem therein, and with the packing member or sealing element (of either embodiment) of the present invention disposed in operative relation thereto.

Figure 7 represents a perspective view of one form of retaining cage adapted to confine, retain and compress the annular sealing member of the present invention in operative juxtaposition of the valve-stem guide and valve-stem.

The present invention contemplates a generally annular sealing member 8 or 9, or others more or less like 8 or 9, composed partly or wholly of a generally resilient deformable material having substantial recovery similar to rubber but capable of withstanding the action of oil or gasoline at temperatures commonly encountered in the intake passageways of the cylinder blocks or cylinder heads of internal combustion engines or in the zones thereof.

We have found that certain amorphous organic materials such as chlorinated butadiene (chloro-2-butadiene-1,3) in the polymerized state, sometimes referred to as chloroprene, a commercial form of which is available under the trade name "Duprene", and the amorphous composition of polymethylene polysulphides, known under the commercial or trade name "Thiokol", when associated with compressing means which will maintain them under pressure around a valve stem and against a valve stem guide, will produce a sealing effect which is more efficient and more permanent than that available by any of the means now commonly employed.

Thus, we have found that by compressing, preferably in an axial direction, an annulus of such synthetic or artificial elastic amorphous organic materials as those above-mentioned and others which may together be classified as synthetic rubbers, characterized by the fact that they are comparatively non-soluble in mineral oils such as motor oil and gasoline, and that they are not subject to deterioration under the influence of such mineral oils, and further characterized by their capacity to take a "set" in the nature of vulcanization similar to that of natural rubber, we are able to produce a seal between the valve-stem and the valve-stem guide which combines great efficiency with great permanence, because we have found that an annulus formed wholly or partly of such material when under compression, will maintain a sliding contact with substantially no wear due to the continued sliding contact, and the effect of which will not be deleteriously affected either by oil or gasoline nor by substantial amounts of heat, such as perhaps 400° Fahrenheit, more or less, and the efficiency of which may in fact be enhanced by such oil and temperature conditions.

According to the present invention, any of the foregoing elastic and oil-resistant synthetic organic materials are preferably combined with organic or mineral fibres such as cotton fibres or asbestos fibres or mixtures of the two, in any suitable proportion. This combination may be effected by combining the loose fibres with the synthetic materials aforesaid while such synthetic materials are still in a plastic and comparatively moldable state, or this combination may be effected by forming the fibres or mixtures of such fibres into any one of several textile formations, such as into woven, knitted, braided or felted fabric layers or sheets or into woven, knitted, braided or twisted cords or strands of solid or tubular formation, and then associating such elastic synthetic organic materials with such fibrous formations either by impregnating the former with the latter or by calendering the latter into the former while the latter are in a more or less plastic and moldable state, or by subjecting adjacent layers or sheets of the fibrous formations and the elastic synthetic materials to pressure so as to intimately unite the two.

Figure 1 illustrates a sealing member embodying the present invention, which may be formed of a composite sheet material illustrated in a fragmentary way in Figure 2, formed of successive layers or plies of woven, knitted or felted textile formations of cotton or asbestos or mixtures of the two, with the synthetic, elastic organic materials interspersed between the successive layers of the textile formations aforesaid and more or less penetrating the interstices of the layers themselves, depending upon the degree of penetration desired. This union may be effected, as stated, either by impregnation or by superimposing alternately, layers of said textile formations and layers of said synthetic organic compounds, and subjecting the mass to pressure and heat in the presence of any of the now conventional vulcanizing agents suitable for such synthetic materials, which vulcanizing agent may be compounded into such materials beforehand. The annulus 8 may then be cut out of the sheet 10 by ordinary punching operations through suitable cutting and punching dies. If desired, the individual annular sealing members may be similarly formed by superimposition of successive textile layers or successive layers of such organic compounds in the annular form and compressing such successive alternate layers in a suitable mold conforming to the annulus desired.

If desired, strands or bands of substantial length may be formed as indicated in Figure 4, by forming generally elongated narrow textile formations by weaving, knitting, braiding or twisting textile strands together, either into solid formation or into tubular formation, and incorporating any of the aforesaid organic compounds by impregnation, calendering or by intertwining narrow strands or such organic materials during the formation of the strand, as for instance by twisting, knitting, braiding, etc. or by weaving, knitting or braiding or twisting the fibrous textile yarns or strands about an elongated central core of the organic material so as generally to encase such synthetic organic core, and then subjecting the resultant product to pressure to set the material to the desired cross-sectional shape and to cause penetration of the organic material through the interstices of the textile formations. Figure 4 merely represents one of the several possible formations; the textile formation 11 indicated in Figure 4 being either a tubular woven, a tubular knitted, or a tubular braided textile formation surrounding a core 12 of the synthetic organic materials aforesaid and made in a more or less continuous elongated form by any of the conventional textile methods well known, from which suitable lengths can then be cut on a bias, indicated at 13, and bent to form the annular packing member or sealing member 9 with the similarly bias-cut ends in abutting relation to each other. If desired, the annulus 9 may be subjected to compression in a mold conforming to the ultimate shape and size of the sealing annulus desired so as more accurately to shape the sealing member, as indicated in Figure 3.

The sealing members 8 or 9 or the like, may also incorporate a graphite material indicated at 14, either on the surface or throughout the mass thereof, further to minimize friction, and this may be applied either by compounding with the fibrous constituents of the sealing member, or by initially compounding with the synthetic organic constituents of the sealing member or both, or it may be applied to the generally finished product by application to the surface thereof, while the synthetic organic material is still in the generally soft condition, and then applying pressure thereto to cause adherence of the graphite flakes to the surface. The graphite flakes in Figures 1, 3 and 4 are greatly enlarged merely for purposes of illustration, it being understood that the actual flakes are comparatively minute.

The sealing annuli 8 or 9 or the like, are then applied to the end of a valve-stem guide 15 or 16 of an internal combustion engine or the like, surrounding the valve stem 17, and confined radially by a generally conforming metallic cage 18, which serves generally to confine the sealing member in a radial direction, and held under axial compression against the end of the valve-stem guide by radially resilient spring fingers 19 having terminal claws 20 which engage into an annular groove or recess in the outer surface of the valve-stem guide, and which is so proportioned that the sealing annuli 8 or 9 are placed under initial axial compression as the claws 20 of the resilient spring fingers 19 are hooked into the locking groove or recess 21 of the valve-stem guide. This axial compression tends to deform the sealing annuli and tends to establish a firm sealing contact against the cylindrical surface of the valve stem and also against the terminal surface of the valve stem guide which is not diminished or deteriorated, but maintained throughout a comparatively long useful life span of the sealing member which tends to maintain the initial compression imparted to it, as aforesaid, by the metallic confining cage.

As the sealing annuli 8 or 9, or the like, are formed in the first instance under some pressure, the fibrous content thereof tends to be compressed or tends to become compacted beyond its normal solidity. In use, this compression in the fibrous constituents is gradually released thereby to improve the "fit" of the sealing annuli against the valve-stem and against the end of the valve-stem guide. So, there is a tendency of the sealing annuli to swell slightly in use, partly due perhaps to this release of the compacted fibrous constituents, and partly perhaps due to a slight swelling on the synthetic amorphous organic material which, while insoluble in mineral oils, also tends to increase in size slightly. Whether this is due to some action between the oil and the said organic material, or whether it is due to a release of some of the initial compression imparted to the material in the formation of the annuli, that is, in the pressing of the annuli in forming dies or stamping dies, may not be accurately determinable. However, the sealing annuli do tend resiliently to contact the valve-stem and the valve-stem guide to effect a seal. It has also been found that when this composite sealing annulus is installed in the general manner shown, there is comparatively little friction between the valve-stem guide and the sealing annulus, notwithstanding the fact that the latter is pressed into engagement with the former and that there is no substantial wear on the sealing annulus (nor upon the valve-stem).

So also, we may disperse the amorphous oil resistant elastic material through the fibrous body (as, for instance, a twisted asbestos or braided asbestos cord) somewhat incompletely, so that the oil resistant amorphous material does not completely fill the spaces between the fibrous filaments, nor completely seal the exterior surface of the sealing annuli and so that, as a result, there may be some penetration of oil into the fibrous body or fibrous constituents of the composite packing thereby tending to release the compression in the fibrous constituents and also tending to fill he interstices in the fibrous constiuents or in the fibrous body portion. Nevertheless, the absorption of oil is in no instance as great as in the conventional felt packing ring, so that no leakage of oil actually takes place past the valve-stem or through the valve-stem guide, and so that the oil consumption will be materially less than with conventional felt packing rings or other now conventional packing means.

Also by virtue of the packing means of the present invention, the carburetor setting of the engine may be more accurate and more effective because the sealing means of the present invention effectively seals against the passage of air through the valve-stem guide and thus makes it easier to adjust the carburetor to the desired setting because of the absence of air leakage through the many valve stems which otherwise variously disturbs or variously affects the vacuum on the suction or intake stroke. This is an important item in the efficient operation of internal combustion engines because this air leakage not only makes it difficult to initially set the carburetor, but also tends to disturb the carburetor efficiency or the efficiency of any given carburetor setting as the engine gets older.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new, and desired to be secured by Letters Patent, is:

1. A valve stem packing device for use between the valve stem guide and the rapidly reciprocating valve stem of an internal combustion engine, which are subject to high temperature and oil during the operation of the engine, for preventing the passage of oil-bearing gases between said valve stem guide and the rapidly reciprocating valve stem, said valve stem packing device including a generally annular sealing member containing a substantial proportion of an oil-resistant synthetic organic elastic material adapted to surround the valve stem and to bear against an end of the valve guide, and a metallic cage surrounding said annular sealing member and having a portion for holding the sealing member against the end of the guide, another portion interlockingly engageable with the guide, and an intermediate portion connecting the two named portions, said intermediate portion being comparatively inextensible.

2. A valve stem packing device for use between the valve stem guide and the rapidly reciprocating valve stem of an internal combustion engine, which are subject to high temperature and oil during the operation of the engine, for preventing the passage of oil-bearing gases between said valve stem guide and the rapidly reciprocating valve stem, said valve stem packing device including a generally annular sealing member containing fibrous material and a binder of oil-resistant synthetic organic elastic material adapted to surround the valve stem and to bear against an end of the valve guide, and a metallic cage surrounding said annular sealing member and having a portion for holding the sealing member against the end of the guide, another portion interlockingly engageable with the guide, and an intermediate portion connecting the two named portions, said intermediate portions being comparatively inextensible.

DELMAR D. ROBERTSON.
GEORGE L. BRIGGS.